July 25, 1939.   N. H. FAYERWEATHER   2,166,947
SECTOR DISK OPERATING MECHANISM
Filed March 4, 1937   2 Sheets-Sheet 1
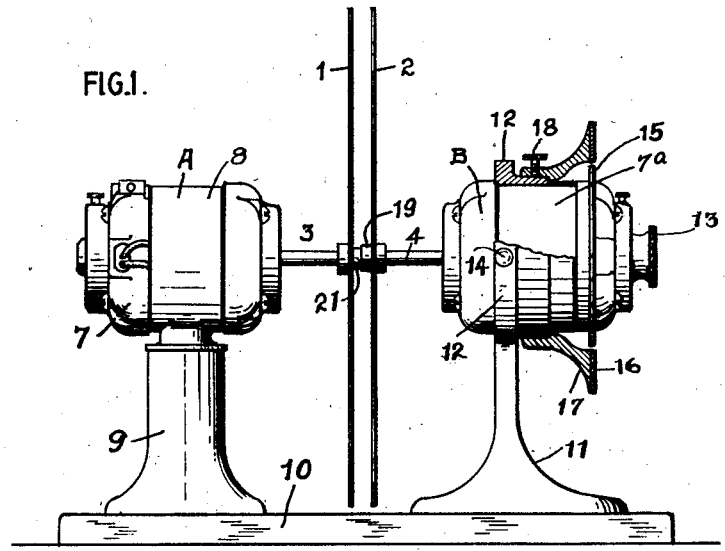
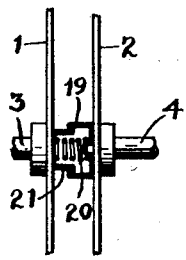
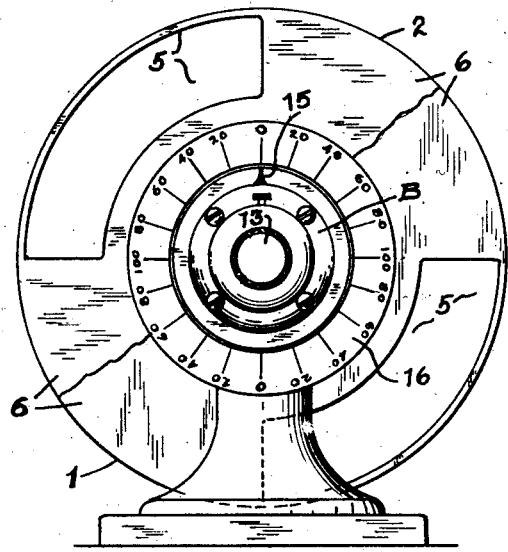
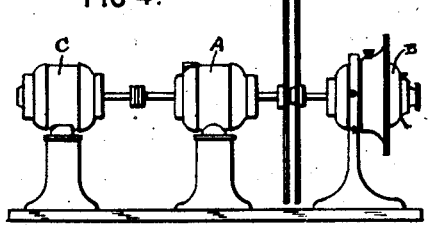
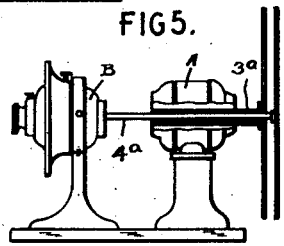
INVENTOR
NEUMAN H. FAYERWEATHER.
BY
Brockett, Hyde, Higley + Meyer.
ATTORNEYS.

July 25, 1939.  N. H. FAYERWEATHER  2,166,947
SECTOR DISK OPERATING MECHANISM
Filed March 4, 1937   2 Sheets-Sheet 2

INVENTOR
NEUMAN H. FAYERWEATHER.
BY
Brockett, Hyde, Higley & Meyer
ATTORNEYS

Patented July 25, 1939

2,166,947

UNITED STATES PATENT OFFICE 2,166,947

SECTOR DISK OPERATING MECHANISM

Neuman H. Fayerweather, Cleveland, Ohio, assignor to Frober Faybor Company, Cleveland, Ohio, a corporation of Ohio Application March 4, 1937, Serial No. 129,044

7 Claims. (Cl. 88—61)

This invention relates to operating mechanism for sector disks used for various purposes, such as in photometers for varying the quantity of transmitted light.

Two apertured sector disks placed opposite to each other in parallel planes and rotated synchronously permit the transmission through them of a quantity of light depending upon the angular value of the net aperture, a value which is varied by angular displacement of the two disks with reference to each other.

Ordinarily such disks are driven from the same power source with a geared or other mechanical operating connection between them permitting their relative angular displacement while rotating, but such constructions are not only costly but also wear and lost motion in the connection soon introduce inaccuracies into the scale readings sufficient to destroy their value for fine measurement.

The present invention has for its object to provide improved driving mechanism for such sector disks, which does away with all mechanical connections between the two disks or with their drivers or adjusting devices, in which the initial cost of construction is very materially reduced, which permits extremely accurate measurement of the net aperture, and in which ordinary wear and tear in no manner interfere with accuracy of measurement.

A further object of the invention is to provide improved operating mechanism for two rotatable sector disks, including two synchronously operating motor devices, one for each disk, together with means whereby said disks may be angularly displaced relatively to each other by relative displacement of the motor fields while the motors are in operation.

Further objects of the invention are in part obvious and in part will appear more in detail hereinafter.

Figure 6:
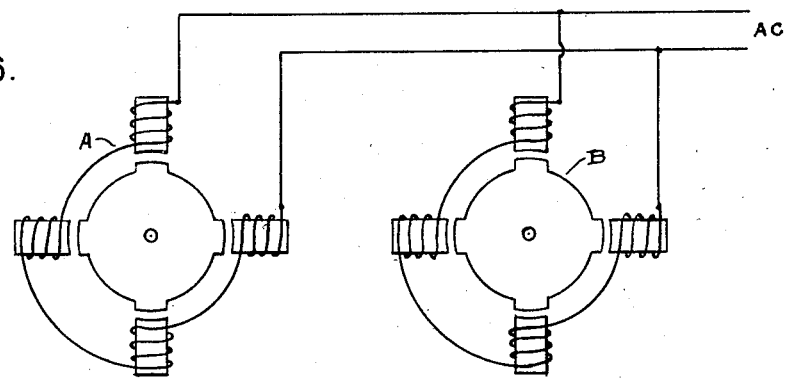
Figure 7:
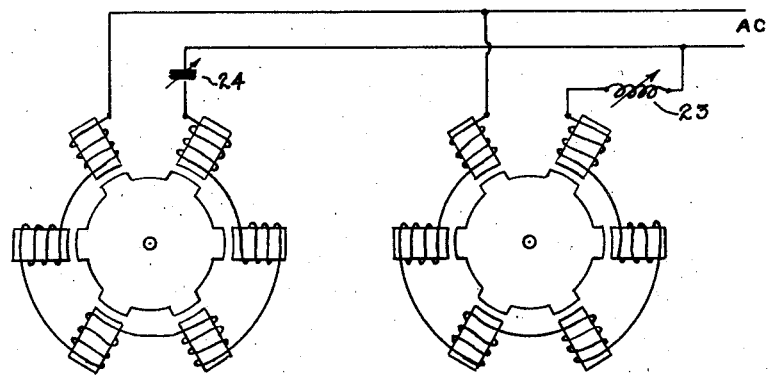
Figure 8:
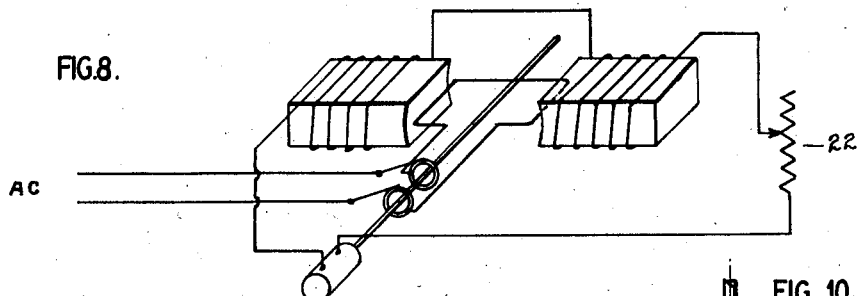
Figure 9:
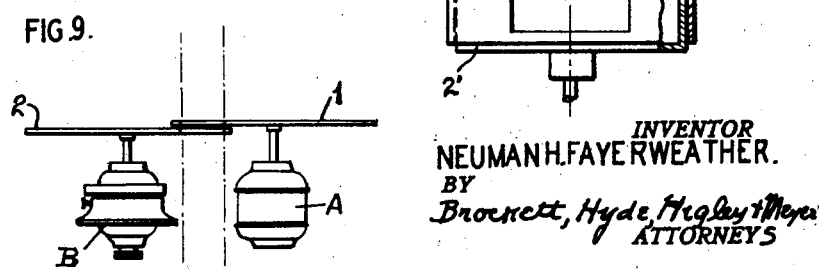
Figure 10:
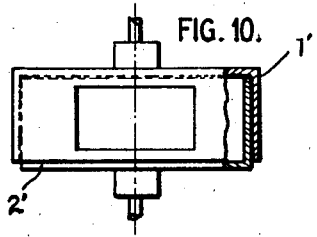

In the drawings, Fig. 1 represents a side elevation of two sector disks and their driving motors, parts of one of the motor mounts being broken out and in section to expose internal construction; Fig. 2 is a detail elevation from the right in Fig. 1; Fig. 3 is an enlarged fragmentary view of the disk hub portions shown in Fig. 1; Fig. 4 is a detail elevation showing another arrangement of motors; Fig. 5 is a sectional elevation, somewhat diagrammatic, showing still another arrangement of the motors and disks; Fig. 6 is a wiring diagram for the motor arrangement shown in Fig. 1; Fig. 7 is a similar view of another arrangement; Fig. 8 is a diagrammatic illustration of still another construction; Fig. 9 is a plan view, showing a modified arrangement of the disks to rotate on parallel axes; and Fig. 10 shows a pair of members of modified form suitable for employment for the purposes of the invention.

According to the present invention, instead of connecting the two sector disks to each other by mechanical devices including adjustable means for manipulating said devices so as to produce relative displacement of the two disks with all the attendant objections to the use of such gearing, the two sector disks are separately connected to individual driving motors, preferably by direct mounting of the disks upon the motor shafts and with the motors mounted either upon a common axis and of such form and arrangement as to cause the two disks to rotate in the same direction or mounted upon parallel axes with the two disks overlapping and rotating preferably in opposite directions. The motors are also chosen as of a type, form or construction so that they will operate synchronously, or, in other words, the two motors will drive their respective disks in the appropriate direction and at the same constant or uniform speed, preferably a relatively high speed, such as 1500 or 3000 R. P. M. In such an arrangement of motor drive for the two sector disks, the present invention introduces suitable means, readily operable while the disks are rotating at high speed, for producing angular displacement of the two disks relatively to each other, for the purpose of varying the net aperture, all without any necessity of use of mechanical adjusting devices for the purpose.

Referring first to Fig. 9, the two disks 1, 2 are shown mounted upon the shafts of motors A, B. While, as stated, the two disks may lie in parallel planes and rotate upon parallel axes, as thus illustrated, in the more common arrangement the two disks are mounted to rotate in the same direction and upon the same axis. For simplicity and in no sense of limitation the latter arrangement will be described in detail.

Referring to Fig. 1, the two disks 1, 2 are fixedly mounted upon the shafts 3, 4 of motors A and B, the two motors being mounted so that their rotors turn about the same axis, which enables the two disks to be located opposite and closely adjacent to each other in parallel planes. Each disk is provided with the necessary aperture or apertures, the drawings showing each disk provided with two apertures 5, diametrically opposed and each of 90° extent, separated by blank segments 6 of equal angular extent. Any suitable arrangement of diametrically opposed apertures may be used, the diametrical arrangement maintaining proper balance and weight distribution.

Of course, the motors are always arranged, by use of the proper end of each motor shaft, so that when the two motors are energized the two disks turn in the same direction, as will be readily understood. Also, the two motors may respectively lie on opposite sides of the two disks, as shown in Fig. 4, or both motors may lie upon the same side of the group of two disks, as shown in Fig. 5, an arrangement which of course requires the shaft 3a of one motor to be tubular so that the shaft 4a of the other motor can extend through it.

The two motors described may have any suitable mechanical and electrical characteristics to cause their desired synchronous operation and enable appropriate adjustment between the two sector disks. Such adjustment is usually accomplished by relative displacement around the common motor axis, of the motor fields, either by physical displacement of the fields themselves, such as by mechanical rotation of the motor stator, or by relatively angular displacement of the magnetic fields by variation of the electrical characteristics in the field circuits of one or both of the motors.

In the arrangements shown in Figs. 1 and 6 the two motors A and B are synchronous motors connected to the same source of alternating current. The motors themselves, including stators, rotors and windings, are identical. Consequently upon energization they rotate in the same direction at the same speed and in phase with each other, with a definite physical relation between the two disks. Physical adjustment of the stationary frame of one motor about the common axis therefore results in angular displacement of one disk relative to the other around said axis, an adjustment which may be readily accomplished while the motors are in operation. This is accomplished as follows:

Motor A has its stationary frame 7 secured within a fixed ring 8 mounted upon a standard 9 fastened to a suitable support, such as the base 10. The standard 11 for motor B is secured to the same base 10 in proper position so that the two disks will turn about a common axis. In the case of motor B, its standard is provided with a ring 12 in which the stationary motor frame 7a is rotatably mounted, said frame at one end being provided with a knurled knob 13 for mechanically producing such rotation, for adjusting purposes, whenever desired. Any suitable means may be provided for clamping the stationary motor part in any position to which it is adjusted, such as a set screw 14 threaded through the ring 12 and engaging the stationary motor part. Means is provided for indicating the relative position of the two motor frames, for thereby indicating the relative position of the two sector disks and the angular value of the net aperture which they produce. In the arrangement shown the stationary motor part is provided with a pointer 15 movable, by rotation of the stationary motor part, angularly about the central axis along a scale 16 on a ring 17 rotatably mounted upon the ring 12 and capable of being secured in any angular position thereon by the set screw 18. This adjustment of ring 17 enables the true zero point to be readily established in the initial setting of the parts.

With the particular arrangement of disk aperture shown in Fig. 1, to-wit, two 90° apertures and two 90° blank spaces, and assuming the motor is of the 4-pole A. C. variety, as shown in Fig. 6, it is possible, when the two motors come up to full speed, for the two rotors and the disks mounted to move with them to assume either of two positions diametrically opposed or displaced 180° with reference to each other. However, the scale, with its increasing values from zero to a maximum, say to 100, is in four sections distributed in the four quadrants, so that no matter what relative position the two disks assume at full speed, zero on the scale will mean a net aperture of zero value, while 100 on the scale will indicate a net aperture of 100%, with the apertures in the two disks lying directly opposite to each other. This, of course, is on the assumption that in the original assembly the disks are appropriately placed upon their shafts with reference to the rotor parts.

Although it is not necessary, suitable means may be provided for mechanically connecting the two disks, with yield between them, so as to reduce hunting and tend to maintain them in generally appropriate relation. For example, one disk, such as the disk 2, may carry at its center a friction button or cup 19 lightly pressed by a light compression spring 20, against the central portion of the face of disk 1 through a similar cup 21, as shown in Fig. 3. This very light friction between the two disks tends to mechanically hold them together but does not interfere in any way with their self-accommodation and self-adjustment to phase relation, nor does it interfere with relative adjustment for varying the net aperture.

Many other arrangements and types of motors may be employed for the purpose described. For example, Fig. 4 illustrates an arrangement in which the two motors A, B are of the Selsyn type (5-wire), coupled to each other and connected to the same source of alternating current, so that movement of the rotor of one is accompanied by corresponding movement of the rotor of the other. The rotor of the sender, such as A, may be driven by any driver, such as a hand crank or, in the form shown, through a flexible coupling by a third motor C, which may be connected to any source of current and whose only requirement shall be that it produces substantially constant speed.

Again, the two motors may be of synchronous type with D. C. fields, as shown in Fig. 8, in which case the angular value of the net aperture may be readily varied by controlling the strength of the D. C. field by the adjustable resistance 22, and without mechanical rotation of the stationary motor part, as will be readily understood. Likewise with synchronous motors in which the field is A. C., as in Fig. 7, the magnetic field of one motor may be advanced or retarded, angularly about the central axis, by modification of current flow, and particularly of the phase relation with respect to the other motor, by the use of variable inductance 23 or capacity 24, or both, in the field windings, as will be readily understood. In this case, as well as in any case where adjustment of the net aperture is secured by variation in an electrical characteristic, such as capacity or inductance, indication of the value of the net aperture may be secured by indicating the value of the electrical characteristic which is adjusted. Also, any number of poles may be used, Fig. 7 showing six poles, and the scale will of course be of appropriate character. The scale for a 6-pole motor will have three zeros separated by 120°.

While the terms "sector" and "disk" are employed herein, it is to be understood that such term does not necessarily imply an actual disk form for the rotating apertured members. For example, Fig. 10 illustrates a cooperative pair of members 1', 2' coaxially arranged and having nesting cylindrical portions which are cooperatively apertured, each of these members being adapted for individual drive by one of a pair of synchronously operating motors, as before. Obviously, each of these members will have a pair of opposed apertures of rectangular form due to the cylindrical form of the members, instead of the segmental form of aperture in the discoid member illustrated, Fig. 2. Where such cylindrical members are employed it will be apparent that a proper arrangement to control a light beam is with their axes traversing the beam.

In all arrangements described, mechanical connections are dispensed with and relative adjustment of the two apertured disks is accomplished by angular displacement of the motor fields with respect to each other, an adjustment which readily can be accomplished when the motors are operating at full speed. Wear and tear introduces no lost motion having any effect upon accuracy of the values to be read, as will be readily understood.

Further advantages of the invention will be apparent to those skilled in the art.

What I claim is:

1. Apparatus for varying the quantity of transmitted light and comprising, a pair of rotatable members each having an aperture, said members being so arranged that their apertures will traverse the same light beam during rotation of the members, a pair of synchronous motors operating in synchronism with each other arranged each to positively drive one of said members, and means providing for timing adjustment of one of said members to vary their net aperture while said members are driven, by relative displacement between the fields of said motors.

2. Apparatus for varying the quantity of transmitted light comprising a pair of apertured members each having a directly connected driving motor, said members being so arranged that when driven their apertures will traverse the same beam of light in the same general direction, said motors being synchronously operating with respect to each other, and means for displacing the field of one of said motors to provide timing adjustment between said members.

3. Apparatus for varying the quantity of transmitted light comprising a pair of synchronous motors operable in synchronism with each other, each having an apertured member rigidly connected to its rotor, said motors being so arranged that during their operation the apertures of said members will traverse the same beam of light in the same general direction, and means for displacing the field of one of said motors relative to the other to provide timing adjustment between said members.

4. Apparatus for varying the quantity of transmitted light comprising a pair of apertured members each having a directly connected driving motor, said members being so arranged that when driven their apertures will traverse the same beam of light in the same general direction, said motors being synchronously operating with respect to each other, means for displacing the field of one of said motors to provide timing adjustment between said members, and means for indicating the net aperture provided by said members while they are driven.

5. Apparatus for varying the quantity of transmitted light comprising a pair of apertured members each having a directly connected driving motor, said members being so arranged that when driven their apertures will traverse the same beam of light in the same general direction, said motors being synchronously operating with respect to each other, means for displacing the field of one of said motors to provide timing adjustment between said members, and means arranged to be set when said members are stationary to indicate the net aperture provided by said members when they are driven.

6. Apparatus for varying the quantity of transmitted light comprising a pair of apertured members each having a directly connected driving motor, said members being so arranged that when driven their apertures will traverse the same beam of light in the same general direction, said motors being synchronously operating with respect to each other, means for displacing the field of one of said motors to provide timing adjustment between said members, and means frictionally interconnecting said members.

7. Apparatus for varying the quantity of transmitted light comprising a pair of apertured members each having a directly connected driving motor for driving the members in the same direction, said members being so arranged that when driven their apertures will be in at least partial alignment with each other at all times so as to traverse the same beam of light passing through them, said motors being connected to the same source of alternating current and being operable in synchronism with each other whereby said members will be operated at the same speed, and means for displacing the field of one of said motors while it is being driven for varying the quantity of light passing through the net aperture in said members.

NEUMAN H. FAYERWEATHER.